United States Patent [19]

Kawashima et al.

[11] Patent Number: 5,177,137
[45] Date of Patent: Jan. 5, 1993

[54] POLYPHENYLENE SULFIDE RESIN COMPOSITION

[75] Inventors: Kiyotaka Kawashima, Takaishi; Tsuneyuki Adachi, Nara; Matsuo Suzuki, Kishiwada; Shigeaki Nagano; Morikuni Yamamoto, both of Izumiohtsu, all of Japan

[73] Assignee: Dainippon Ink and Chemicals, Inc., Tokyo, Japan

[21] Appl. No.: 467,117

[22] Filed: Jan. 19, 1990

[30] Foreign Application Priority Data

Jan. 19, 1989 [JP]  Japan ................................. 1-10921
Jul. 11, 1989 [JP]  Japan ................................ 1-178398
Jul. 14, 1989 [JP]  Japan ................................ 1-182252

[51] Int. Cl.$^5$ .............................. C08J 81/00; C08J 3/10
[52] U.S. Cl. ............................... 524/413; 524/423; 524/424; 524/425; 524/432; 524/436; 524/449; 524/451; 524/609
[58] Field of Search ............... 524/399, 400, 424, 423, 524/425, 432, 436, 449, 451, 609, 413

[56] References Cited

U.S. PATENT DOCUMENTS 4,017,450  4/1977  Bailey ................................. 525/537
4,395,512  7/1983  Kubota et al. ....................... 524/413
4,659,761  4/1987  Leland et al. ....................... 524/262

FOREIGN PATENT DOCUMENTS 0364181  4/1990  European Pat. Off. .

Primary Examiner—John C. Bleutge
Assistant Examiner—Helen F. Lee
Attorney, Agent, or Firm—Armstrong & Kubovcik

[57] ABSTRACT

A polyphenylene sulfide resin composition comprising
(1) a polyphenylene resin, and
(2) at least one compound selected from the group consisting of
 (a) zinc carbonate,
 (b) manganese carbonate, and
 (c) zinc hydroxide.

5 Claims, 1 Drawing Sheet

POLYPHENYLENE SULFIDE RESIN COMPOSITION

BACKGROUND OF THE INVENTION

The present invention relates to polyphenylene sulfide (hereafter, sometimes referred to as "PPS") resin composition for producing molded articles which composition can be molded into articles with causing less corrosion to the metallic mold used upon their fabrication or molding of to metal portions used in various built-up parts comprised by such molded articles.

As is well known, PPS resins generally have very high heat resistance, chemical resistance, electric properties and fire resistance, and they exhibit excellent mechanical strength, rigidity and dimension stability by blending them with a reinforcing filler or the like, resulting in that they are used widely for molding various articles such as electric and electronic parts, parts of cars and those of machines.

However, the conventional PPS resins generate gas or gases corrosive to metals at high temperatures or under molten conditions, which causes various problems that metallic molds and molding machines could be corroded upon molding or that upon aging molded articles at temperatures not lower than 100° C. and not higher than the melting point, corrosion could occur to metal portion of built-up parts comprised by the molded articles or to insert metal parts.

For example, when PPS resins are used as a relay base, the metal contact of the relay would be corroded to cause contact failure, or to deteriorate adhesion strength of solder at the insert metal portion would decrease due to corrosion.

More particularly, there are now observed two types of problems currently recognized as being involved in the corrosion of metals due to PPS resins corrosions may roughly be grouped into two types. One is the occurrence of the corrosion of metallic mold or the like upon melting PPS resin, and the other is that the corrosion of silver plated terminals or the like upon aging at temperatures lower than the melting point of the resin.

There have heretofore been known a method in which alkali metal hydroxides or carbonates are added as described in U.S. Pat. No. 4,017,450 and a method in which hydroxides, oxides, aromatic carboxylate of metals belonging to the Group IIA of the periodic table are added as described in Japanese Patent Publication (Kokai) No. 62-109850.

However, in both cases, no satisfactory effect can be obtained. Particularly, it can be said that no effect is obtained on the prevention of the occurrence of silver corrosion, for example, when PPS resin is aged at temperatures not lower than 100° C. and not higher than the melting point of the resin. Furthermore, since the additive itself is water-soluble or hygroscopic, if not water-soluble, the addition of additives as described above leads to decrease in the water resistance of the resulting composition and therefore, when PPS resin is used, for example, as an insulating material reinforced with glass fiber, this causes decrease in the insulating property of the material to a greater extent at high humidity.

Also is known a method in which hydrotalcite is added to PPS resin in order to reduce the corrosion of metals as described in U.S. Pat. No. 4,529,769. This method, however, is inferior to the preceding proposals in which the alkali metal hydroxides or carbonates are added in the primarily expected effect of reducing the corrosion of metals which would occur to metallic molds although less decrease in the insulating property of the composition is attained by the method.

There are known a composition for molding electronic parts which comprises PPS resin and zinc oxide and a method for preventing the color shift thereof as described in Japanese Patent Publication (Kokai) No. 59-181408. The zinc oxide-added PPS composition still has disadvantages not only that insufficient effects can be obtained for preventing the corrosion of metallic molds upon melting PPS and that of silver-plated terminals and the like upon aging at a temperature not higher than the melting point of PPS but also that the addition of such compound even in small amounts decreases greatly the strength of the resulting composition.

SUMMARY OF THE INVENTION

It is an object of the present invention to provide a polyphenylene sulfide resin composition which greatly decreases both the corrosion of metallic molds upon melting PPS and the corrosion of silver-plated terminals and the like upon aging at a temperature not higher than the melting temperature, and which retains water resistance and, when used as an insulating material, good insulating property, as well as excellent mechanical strength.

Therefore, the present invention provides a polyphenylene sulfide resin composition comprising
(1) a polyphenylene resin, and
(2) at least one compound selected from the group consisting of
(a) zinc carbonate,
(b) manganese carbonate, and
(c) zinc hydroxide.

In another aspect, the present invention provides a polyphenylene resin composition comprising
(1') a polyphenylene resin, and
(2') γ-alumina, and
(3') at least one compound selected from the group consisting of
(a') zinc carbonate,
(b') manganese carbonate,
c') magnesium carbonate, and
(d') zinc hydroxide.

In still another aspect, the present invention provides polyphenylene sulfide resin composition comprising a polyphenylene sulfide resin, the above-described compound or compounds and a filler.

One of the characteristics of the PPS resin composition of the present invention is that both the corrosion of metallic molds upon melting PPS and the corrosion of silver-plated terminals and the like upon aging PPS resin and its molded article at a temperature not higher than the melting point thereof decreases to a greater extent.

In contrast, the conventional methods, for example, involving the addition of hydroxides or carbonates of elements belonging to the Group IA of the periodical table, or the addition of hydroxides or oxides, etc. of the Group IIA of the periodical table and hydrotalcite are in both cases intended to reduce gases corrosive to metals upon melting PPS resin but effects are unsatisfactory.

Furthermore, no preventive effect on corrosion is found when these conventional methods are applied to gases corrosive to metals, particularly silver, under conditions where PPS resin and its molded articles are heated for aging for a long period of time at a temperature not higher than the melting point thereof.

Another characteristics of the PPS resin composition of the present invention is that not only it exhibits good water resistance but also excellent insulating property at high humidity when it is used as insulating material.

As described above, many of hydroxides and carbonates of the elements belonging to the Group IA of the periodic table are readily water-soluble, and many of hydroxides, oxides, etc. of the elements belonging to the Group IIA of the periodic table have high hygroscopic property.

Furthermore, although hydrotalcite is itself insoluble to water, reversible movement or transfer of water molecules occurs due to ion exchange in the three-dimensional structure, which leads to reversible uptake and release of water by the composition containing hydrotalcite. In the area where hydrotalcite is added in a large amount, the amount of absorbed water (i.e., the amount of water water adsorbed) increases by leaps and bounds.

On the other hand, the compounds contained in the resin composition of the present invention are all relatively insoluble to water and have very low hygroscopic property. Therefore, the resin composition of the present invention exhibits markedly improved water resistance and in addition it has extremely excellent moisture resistant insulating property as represented by retention of volume resistivity at high humidity for a long period of time when the resin composition is used as in insulating material.

Still another characteristics of the resin composition of the present invention is that it has excellent mechanical strength.

The conventional methods in which only γ-alumina is added to the resin composition suffers decrease in the tensile strength, flexural strength, impact strength and the like in the case where a large amount of γ-alumina is added for preventing the corrosion of metallic molds upon melting.

Furthermore, according to conventional method, for example, one in which the resin is blended with zinc oxide, remarkable decrease in the strength of the resulting composition even when a small amount of the compound is added.

Therefore, the resin composition of the present invention decreases considerably gases corrosive to metals which would be generated by PPS resin and has remarkably improved water resistance, and further it has extremely excellent moisture resistant insulating property as represented by retention of volume resistivity at high humidity for a long period of time when the resin composition is used as an insulating material. In addition, it has high mechanical strength.

DETAILED DESCRIPTION OF THE INVENTION

Figure 1:
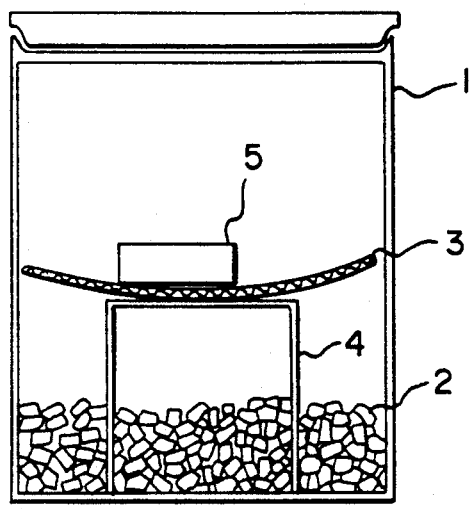
FIG. 1 is a side-elevational, cross-sectional view of a sealable vessel used in a method for determining the corrosiveness of a material to a steel material of the type used in metallic molds.
Figure 2:
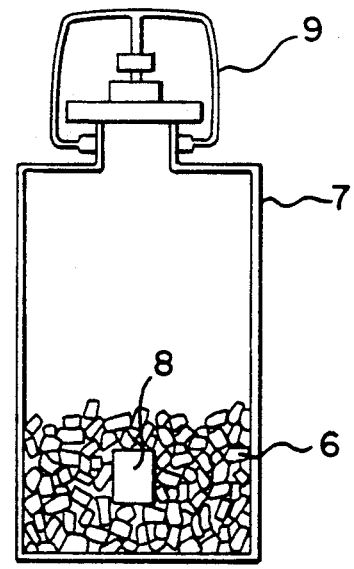
FIG. 2 is a side-elevational, cross-sectional view of a glass pressure bottle used in a method for determining the corrosiveness of a material to silver plating.

The PPS resin which can be used in the present invention is preferably one which contains a structural unit represented by the formula

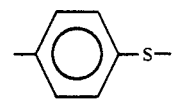

This polymer can be prepared in various ways, by, for example, a method in which p-dichlorobenzene is polymerized in the presence of sulfur and sodium carbonate, a method in which p-dichlorobenzene is polymerized in the presence of sodium sulfide or sodium hydrogen sulfide, sodium hydroxide or hydrogen sulfide in a polar solvent, and sodium hydroxide, and self-condensation of p-chlorothiophenol. Suitable method is a method in which sodium sulfide is reacted with p-dichlorobenzene in an amide-based solvent such as N-methylpyrrolidone, dimethylacetamide or the like, or a sulfone-based solvent such as sulfolane. In this case, it is preferred to add an alkali metal salt of a carboxylic acid or a sulfonic acid, or an alkali hydroxide to the reaction mixture in order to control the degree of polymerization. The above-described PPS resin may be a polymer containing not higher than 40 mol % of

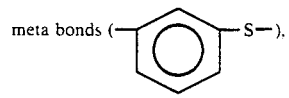
meta bonds

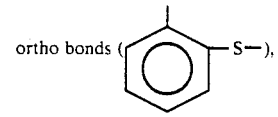
ortho bonds

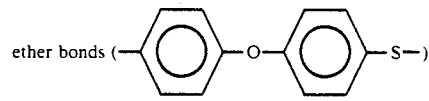
ether bonds

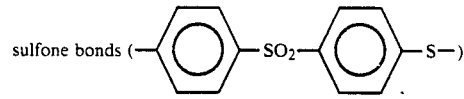
sulfone bonds

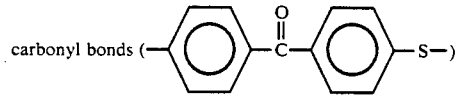
carbonyl bonds

biphenyl bonds

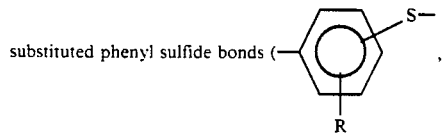
substituted phenyl sulfide bonds wherein R represents an alkyl group, a nitro group, a phenyl group, or an alkoxy group),

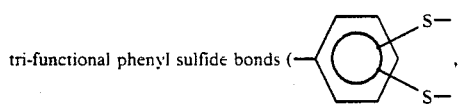

etc. in the form of random-, block- or graft-polymer portion.

PPS resin can be prepared by general manufacturing methods, for example, (1) reaction between a halogenated aromatic compound and an alkali sulfide (U.S. Pat. No. 2,513,188, Japanese Patent Publication (Kokai) No. 44-27671 and Japanese Patent Publication (Kokai) No. 45-3368), (2) condensation reaction of thiophenols in the presence of an alkali catalyst or a complex salt (U.S. Pat. No. 3,274,165, British Patent 1,160,660), and (3) condensation reaction of an aromatic compound in the presence of sulfur chloride and a Lewis acid catalyst (Japanese Patent Publication (Kokoku) No. 46-27255, and Belgian Patent 29437). Any appropriate method can be selected from them depending on the purpose.

Zinc carbonate which can be added to the resin composition may be normal zinc carbonate or basic zinc carbonate commercially available as reagent.

By the term "γ-alumina", component (a) to be used in the present invention, is meant intermediate alumina or anhydrous alumina. Suitable examples of such alumina include $\rho$-, $\chi$-, $\eta$-, $\delta$-, $\theta$, and $\kappa$-type crystalline aluminas, and Al-Si spinel. One of the characteristics of γ-alumina is that as compared with α-alumina and hydrated alumina, γ-alumina has a very large specific surface area and another characteristics is that crystal of γ-alumina is divided into minute pieces which remain in unorganized and disordered state. It is supposed that the adsorbability of gases by the crystals remarkably increases due to the characteristics of γ-alumina, which gives rise to marked effect for decreasing corrosive gases.

Upon baking at high temperatures various hydrated aluminas are converted to γ-alumina and finally to α-alumina (generally, "alumina" simply used refers to α-alumina.), and the γ-alumina usually contains a small amount of water. Although the moisture content of γ-alumina is not limited particularly, and those γ-aluminas which do not show decrease in weight upon heating at 400° C. are practically acceptable. γ-Alumina may be of any particle size but usually the particle size may range from 0.2 to 500 μm, preferably from 1 to 300 μm. When the particle size is too large, the effect of decreasing corrosive gases, particularly those to metals is insufficient and the surface of the molded composition would become rough. On the other hand, if the particle size is too small, there tend to occur various troubles such as scattering of powder of raw material or decreased uptake or imbibition of the resin composition by the employed machine during extrusion-kneading, increase in the viscosity of the resin composition, and the like. The specific surface area of γ-alumina used in the present invention is usually not lower than 3 m²/g, preferably not higher than 10 m²/g.

γ-Alumina, one of the components of the resin composition of the present invention is added to PPS resin in an amount of from 0.01 to 10 parts by weight per 100 parts by weight of the resin. There is observed a tendency that when the content of γ-alumina is too small, the effect of decreasing corrosive gases will become poor and on the contrary, when that content is too large, the melt flow of the resin composition will be aggravated.

More specifically, the resin composition of the present invention has excellent preventive effect on corrosions caused by gases corrosive to metals which would be generated upon melting and this advantage is ascribable to the addition of (a) γ-alumina and (b) at least one compound selected from zinc carbonate, manganese carbonate, magnesium carbonate and zinc hydroxide to PPS resin. In particular, as compared with similar conventional resin composition containing only γ-alumina as the additional component as described in Japanese Patent Publication (Kokai) No. 62-241962, the resin composition of the present invention exhibits excellent gas-trapping ability for trapping or capturing gases corrosive to metals, particularly to silver, which gases would be generated upon aging by heating for a long period of time at a temperature hot higher than the melting point of the PPS resin, the advantage being mainly due to the presence of at least one compound selected from zinc carbonate, manganese carbonate, magnesium carbonate and zinc hydroxide. The preventive effect of the resin composition of the present invention is achieved by synergism between γ-Alumina as component (a), and at least one compound selected from zinc carbonate, manganese carbonate, magnesium carbonate and zinc oxide, as component (b). On the other hand, substantially no decrease in the strength of the resin composition is observed by the addition of the components (a) and (b) in combination. More particularly, due to synergism between the components (a) and (b), the composition of the present invention can exhibit sufficient effect for preventing the corrosion of metallic molds upon melting the resin with the additional components in smaller amounts as compared with the similar composition but containing γ-alumina alone. It also has effect for preventing the corrosion of metals upon aging by heating at a temperature not higher than the melting point of the resin. Moreover, it is advantageous in that when molded into articles it shows, over a wide range of content of additional compounds, no decrease in the mechanical strength, e.g., tensile strength, flexural strength, impact strength, etc., of the molded resin composition.

In the present invention, the amount of the additional compound to be added to PPS resin, i.e., zinc carbonate, manganese carbonate, zinc hydroxide, magnesium carbonate and/or γ-alumina, is preferably from 0.01 to 10 parts by weight per 100 parts by weight. When the additional compounds are used in amounts in the above-described range, the effect of decreasing gases corrosive to metals is remarkable. On the other hand, it is not preferred to use the additional compounds in amounts outside that range, since in that case not only the flowability of the resin composition in molten state decreases but also the mechanical strength of the resin composition decreases.

Various fillers or additives other than those described above can be added to the resin composition of the present invention. Examples of the reinforcing materials and fillers include glass fiber, carbon fiber, calcium titanate, silicon carbide, ceramics fiber, metal fiber, silicon nitride, barium sulfate, calcium sulfate, kaolin, clay, bentonite, sericite, zeolite, mica, talc, wallacetonite, PMF, ferrite, calcium silicate, calcium carbonate, dolomite, antimony trioxide, titanium oxide, iron oxide, silt glass, glass beads, glass balloons and the like.

The fillers can be added to the resin composition so as to be present therein in an amount of preferably from 5 to 75% by weight, more preferably from 20 to 70% by weight. Among them, fibrous reinforcing material can be used in an amount of preferably from 20 to 60% by weight.

The resin composition of the present invention may contain lubricants such as graphite, molybdenum disulfide and polytetrafluoroethylene and stabilizers thereof.

The resin composition of the present invention may also contain antioxidants, thermal stabilizers, ultraviolet absorbents, lubricants, crystalline germ agents, coloring agents, silane coupling agents, releasing agents within the range not departing from the object of the present invention.

Furthermore, the resin composition of the present invention may contain other thermosetting resins, thermoplastic resins without departing from the object of the present invention. For example, there can be blended with the resin a small amount of one or more of, for example, epoxy resin, silicone resin, polyimide, polyphenylene ether, polyamide, polycarbonate, polysulfone, polyether sulfone, polyarylate, polyacetal, polyether ketone, polyether ether ketone, polybutylene terephthalate, polyethylene terephthalate, polyamideimide, polyether imide, etc.

The PPS resin composition of the present invention can be prepared by various known methods. For example, it can be obtained by mixing PPS resin and additional compound in a Henschel mixer, tumbler or the like beforehand, supplying the mixture to a mono- or biaxial extruder or the like, melt-kneading the mixture at a temperature of from 260° C. to 360° C., and then granulating or pelletizing it. Upon mixing, other reinforcing agents, fillers or various other additives can be added.

The PPS resin composition of the present invention can be applied to various utilities such as electric and electronic parts, parts of machines, parts of cars, etc. Particularly, when it is used as an insulating material, it is useful as industrial material for the production of switch parts, relay parts, connectors etc.

EXAMPLES

The invention will be described in greater detail with reference to the following examples and comparative examples. However, it should not be construed that the present invention is limited to the examples.

In the examples and comparative examples, various characteristics are according to the following methods and standards.

Corrosive to Metals (I) Corrosiveness of steel material (SKD-11) for metallic molds Granulated pellets (2) (100 g) were charged in a metal vessel (1) tightly sealed. In the vessel, was placed 20-mesh wire mesh (3) which was fixed to the vessel with a support metal plate (4), on which was mounted a steel block (5) made of SKD-11, a high alloy for machine tools having a composition of C: 15%, Cr: 12.0%, Mo: 100%, and V: 0.4%, and having surface roughness of not higher than 3 μm, and heated at a temperature of 340° C. for 6 hours. After the heat treatment, the SKD-11 steel block (5) was taken out of the vessel and placed and kept in an incubator under the conditions of 70° C./95% RH for 6 hours. Thereafter, corrosion of the steel material was observed.

(II) Corrosiveness of silver upon aging by heating at a temperature not higher than the melting point of the resin granulated pellets (6) after drying at 120° C. for 3 hours each in an amount of 50 g were charged in a glass pressure bottle (7). A silver-plated plate (8) (thickness of plating: 7 μm, weight: 2 g) was completely buried in the pellets. The pressure bottle (7) was tightly sealed with a metal jig (9) for fixing the bottle and heated at 180° C. for 50 hours. After the heat treatment, the corrosion of the silver-plated plate (8) was observed.

Water Resistance

Dumbbell sample pieces of 1.6 mm thick for tensile tester were molded from the granulated pellets, and the pieces were subjected to pressure-cooker treatment (PCT) at 120° C. under load of 2 kgf/cm$^2$ for 30 hours, and then tensile strength of the samples was measured according to ASTM D-638), and compared with initial strength thereof.

Insulating Property

Discs of 1.6 mm thick for ASTM D-257 test were molded from the granulated pellets, these samples were subjected to PCT at 120° C. for 30 hours under load of 2 kg/cm$^2$. Volume resistivity of the disc samples was measured and compared with initial values thereof. Volume resistivity tests were conducted according to ASTM D-b 257.

REFERENCE EXAMPLE 1

Synthesis of PPS Resin

In a 50 liter autoclave were charged 70 parts of N-methylpyrrolidone, 0.99 part of sodium sulfide nonahydrate, 0.60 part of sodium benzoate and 0.15 part of sodium hydroxide (in proportions by mole, 50 mole scale) and the temperature was elevated to 210° C. in nitrogen stream to effect dehydration to a dehydration ration of 110%. After cooling the reaction system of 160° C., p-dichlorobenzene was was charged in a molar proportion of 1.0:1.0 followed by sealing. Then, the internal pressure was elevated to 25 kg/cm$^2$ with nitrogen. Taking into consideration generation of heat by polymerization, the temperature of the reaction system was controlled and elevated to 2170° C. and polymerization was continued for 5 hours with stirring. As the result the internal pressure increased to 17 kg/cm$^2$. Then, the pressure of the reaction system was released after cooling the system. The contents were poured in to a large amount of water to recover flaky polymer. The polymer was obtained as white flakes in a final yield of 70% after repeated washing with hot water and acetone.

The PPS resin powder then obtained was charged in a ribbon blender and stirred at 270° C. with blowing air so as to heat PPS so that it can crosslink partially in the form of powder to finally have an intrinsic viscosity to a value of 0.3.

EXAMPLES 1 TO 4 AND COMPARATIVE EXAMPLES 1 TO 5

Using the PPS resin synthesized in Reference Example 1, raw materials shown in Table 1 were uniformly mixed in proportions shown in Table 1. Thereafter, the mixture was melt-kneaded at 320° C. using a biaxial extruder (diameter: 35 mm) to obtain pellets. The pellets were subjected to evaluation of the corrosiveness of the resin to metals.

Then, the pellets were molded into sample pieces for the evaluation of water resistance and insulating property thereof using a 3 ounce injection molding machine of an in-line screw type under the condition of cylinder temperature: 320° C., metallic mold temperature: 150° C., injection pressure: 1,000 kgf/cm$^2$, and injection speed: moderate. These characteristics were evaluated and the results obtained are shown in Table 1.

were subjected to evaluation of the corrosiveness of the resin to metals.

Then, the pellets were molded into dumbbells for the evaluation of tensile strength thereof using a 3 ounce injection molding machine of an in-line screw type under the conditions of cylinder temperature: 320° C., metallic mold temperature: 150° C., injection pressure: 1,000 kgf/cm$^2$, and injection speed: moderate. Then, water resistance of the dumbbells were evaluated and the results obtained are shown in Table 2.

TABLE 1

| | | Example 1 | Example 2 | Example 3 | Example 4 | Comparative Example 1 |
|---|---|---|---|---|---|---|
| Composition All by Weight | PPS Resin | 60 | 40 | 55 | 40 | 60 |
| | Additional Compound | Basic Zinc Carbonate | Basic Zinc Carbonate | MnCO$_3$ | MnCO$_3$ | Li$_2$CO$_3$ |
| | Amount of Additional Compound | 3 | 1 | 1 | 3 | 3 |
| | Glass Fiber | 40 | 30 | 30 | 30 | 40 |
| | Calcium Carbonate | | | 30 | | |
| | PTFE | | | | 15 | |
| | Mica | | | | | |
| | Talc | | | | 30 | |
| | Calcium Sulfate | | | | | |
| Corrosiveness to Metal* | | ⓒ | ⓒ | ⓒ | ⓒ | ○ |
| Water Resistance | Initial | 1800 | 1400 | 1300 | 1500 | 1700 |
| (Tensile Strength: kgf/cm$^2$) | After PCT | 1550 | 1250 | 1200 | 1350 | 1200 |
| Insulating Property | Initial | 2 × 10$^{16}$ | 4 × 10$^{16}$ | 1 × 10$^{16}$ | 6 × 10$^{16}$ | 2 × 10$^{16}$ |
| (Volume Resistivity: ohm · cm) | After PCT | 1 × 10$^{13}$ | 5 × 10$^{13}$ | 4 × 10$^{13}$ | 2 × 10$^{13}$ | 2 × 10$^{10}$ |

| | | Comparative Example 2 | Comparative Example 3 | Comparative Example 4 | Comparative Example 5 |
|---|---|---|---|---|---|
| Composition All by Weight | PPS Resin | 40 | 40 | 40 | 60 |
| | Additional Compound | Ca(OH)$_2$ | MgO | NaOH | None |
| | Amount of Additional Compound | 1 | 3 | 3 | 0 |
| | Glass Fiber | 30 | 30 | 30 | 40 |
| | Calcium Carbonate | 30 | | | |
| | PTFE | | | | |
| | Mica | | 30 | | |
| | Talc | | | 30 | |
| | Calcium Sulfate | | | | |
| Corrosiveness to Metal* | | Δ | ○ | ○ | X |
| Water Resistance | Initial | 1300 | 1500 | 900 | 1800 |
| (Tensile Strength: kgf/cm$^2$) | After PCT | 1000 | 1000 | 650 | 1700 |
| Insulating Property | Initial | 4 × 10$^{16}$ | 6 × 10$^{16}$ | 6 × 10$^{16}$ | 1 × 10$^{16}$ |
| (Volume Resistivity: ohm · cm) | After PCT | 4 × 10$^{10}$ | 3 × 10$^{10}$ | 2 × 10$^{10}$ | 6 × 10$^{14}$ |

*Corrosion of metallic mold steel upon melting of the resin, and judgement of corrosiveness to metal
ⓒ—No Corrosion
○—Slightly corroded
Δ—Fairly corroded
X—Considerably corroded

TABLE 2

| | | Example 5 | Example 6 | Example 7 | Comparative Example 6 | Comparative Example 7 |
|---|---|---|---|---|---|---|
| Composition All by Weight | PPS Resin | 70 | 70 | 55 | 70 | 60 |
| | Additional Compound | Basic Zinc Carbonate | MnCO$_3$ | ZnCO$_3$ | Li$_2$CO$_3$ | Ca(OH)$_2$ |
| | Amount of Additional Compound | 1 | 1 | 1 | 1 | 3 |
| | PAN Carbon Fiber | 30 | | | | |
| | Pitch Carbon Fiber | | 30 | 30 | 30 | 15 |
| | PTFE | | | | | 15 |
| | Graphite | | | | | 10 |
| | Molybdenum Disulfide | | | 15 | | |
| Corrosiveness to Metal* | | ⓒ | ⓒ | ⓒ | Δ | ○ |
| Water Resistance | Initial | 1900 | 1200 | 1100 | 1100 | 800 |
| (Tensile Strength: kgf/cm$^2$) | After PCT | 1700 | 1000 | 950 | 750 | 550 |

*Same as Table 1

EXAMPLES 5 TO 7 AND COMPARATIVE EXAMPLES 6 AND 7

Using the PPS resin synthesized in Reference Example 1, raw materials shown in Table 2 were uniformly mixed in proportions shown in Table 2. Thereafter, the mixture was melt-kneaded at 320° C. using a biaxial extruder (diameter: 35 mm) to obtain pellets. The pellets

EXAMPLES 8 TO 13 AND COMPARATIVE EXAMPLE 8

Using the PPS resin synthesized in Reference Example 1, raw materials shown in Table 3 were uniformly mixed in proportions shown in Table 3. Thereafter, the mixture was melt-kneaded at 320° C. using a biaxial extruder (diameter: 35 mm) to obtain pellets. The pellets were subjected to evaluation of the corrosiveness of the resin to metals.

The, the pellets were molded into sample pieces for the evaluation of water resistance and insulating property thereof using a 3 ounce injection molding machine of an in-line screw type under the conditions of cylinder temperature: 320° C., metallic mold temperature: 150° C., injection pressure: 1,000 kgf/cm², and injection speed: moderate. These characteristics were evaluated and the results obtained are shown in Table 3.

tion pressure: 1,000 kgf/cm², and injection speed: moderate. Then, the water resistance of the dumbbells were evaluated and the results obtained are shown in Table 4.

EXAMPLES 18 TO 23 AND COMPARATIVE EXAMPLES 12 AND 17

Using the PPS resin synthesized in Reference Example 1, raw materials shown in Table 5 were uniformly mixed in proportions shown in Table 5. Thereafter, the

TABLE 4

|  |  | Example 14 | Example 15 | Example 16 | Example 17 | Comparative Example 9 | Comparative Example 10 | Comparative Example 11 |
|---|---|---|---|---|---|---|---|---|
| Composition All by Weight | PPS Resin | 70 | 70 | 60 | 55 | 70 | 55 | 60 |
|  | Additional Compound*1) | Zn(OH)$_2$ | Zn(OH)$_2$ | Zn(OH)$_2$ | Zn(OH)$_2$ | Li$_2$CO$_3$ | ZnO | Ca(OH)$_2$ |
|  | Amount of Additional Compound | 1 | 1 | 3 | 1 | 1 | 1 | 3 |
|  | PAN Carbon Fiber | 30 |  |  |  |  |  |  |
|  | Pitch Carbon Fiber |  | 30 | 15 | 30 | 30 | 30 | 15 |
|  | PTFE |  |  | 15 |  |  |  | 15 |
|  | Graphite |  |  | 10 |  |  |  | 10 |
|  | Molybdenum Disulfide |  |  |  | 15 |  | 15 |  |
| Corrosiveness to Metal*2) |  | ⊚ | ⊚ | ⊚ | ⊚ | Δ | Δ | ○ |
| Water Resistance | Initial | 1850 | 1200 | 900 | 1050 | 1100 | 750 | 800 |
| (Tensile Strength: kgf/cm²) | After PCT | 1700 | 1000 | 750 | 950 | 750 | 600 | 550 |

*1), *2)Same as Table 3

TABLE 3

|  |  | Example 8 | Example 9 | Example 10 | Example 11 | Example 12 | Example 13 | Comparative Example 8 |
|---|---|---|---|---|---|---|---|---|
| Composition All by Weight | PPS Resin | 60 | 40 | 55 | 40 | 40 | 40 | 60 |
|  | Additional Compound*1) | Zn(OH)$_2$ | Zn(OH)$_2$ | Zn(OH)$_2$ | Zn(OH)$_2$ | Zn(OH)$_2$ | Zn(OH)$_2$ | ZnO |
|  | Amount of Additional Compound | 3 | 1 | 1 | 3 | 3 | 3 | 3 |
|  | Glass Fiber | 40 | 30 | 30 | 30 | 30 | 30 | 40 |
|  | Calcium Carbonate |  |  | 30 |  |  |  |  |
|  | PTFE |  |  |  | 15 |  |  |  |
|  | Mica |  |  |  |  | 30 |  |  |
|  | Talc |  |  |  |  |  | 30 |  |
|  | Calcium Sulfate |  |  |  |  |  |  | 30 |
| Corrosiveness to Metal*2) |  | ⊚ | ⊚ | ⊚ | ⊚ | ⊚ | ⊚ | Δ |
| Water Resistance | Initial | 1700 | 1400 | 1300 | 1500 | 1000 | 1100 | 1350 |
| (Tensile Strength: kgf/cm²) | After PCT | 1500 | 1250 | 1200 | 1350 | 900 | 1000 | 1100 |
| Insulating Property | Initial | 1 × 10$^{16}$ | 5 × 10$^{16}$ | 2 × 10$^{16}$ | 7 × 10$^{16}$ | 1 × 10$^{16}$ | 3 × 10$^{16}$ | 1 × 10$^{16}$ |
| (Volume Resistivity: ohm · cm) | After PCT | 2 × 10$^{13}$ | 3 × 10$^{13}$ | 5 × 10$^{13}$ | 1 × 10$^{13}$ | 2 × 10$^{13}$ | 1 × 10$^{13}$ | 8 × 10$^{12}$ |

*1)Additional Compounds are all of reagent grade (1st grade)
*2)Corrosion of metallic mold steel upon melting of the resin, and judgement of corrosiveness to metal
⊚—No Corrosion
○—Slightly corroded
Δ—Fairly corroded
X—Considerably corroded

EXAMPLE 14 TO 17 AND COMPARATIVE EXAMPLES 9 TO 11

Using the PPS resin synthesized in Reference Example 1, raw materials shown in Table 4 were uniformly mixed in proportions shown in Table 4. Thereafter, the mixture was melt-kneaded at 320° C. using a biaxial extruder (diameter: 35 mm) to obtain pellets. The pellets were subjected to evaluation of the corrosiveness of the resin to metals.

Then, the pellets were molded into dumbbells of 1.6 mm thick for the evaluation of tensile strength thereof using a 3 ounce injection molding machine in an in-line screw type under the conditions of cylinder temperature: 320° C., metallic mold temperature: 150° C., injection mixture was melt-kneaded at 320° C. using a biaxial extruder (diameter: 35 mm) to obtain pellets. The pellets were subjected to evaluation of the corrosiveness of the resin to metals, i.e., the corrosiveness to metallic mold steel and corrosiveness to silver upon aging at a temperature not higher than the melting point.

Then, the pellets were molded into dumbbells for the evaluation of mechanical strength, water resistance and insulating property thereof using a 3 ounce injection molding machine of an in-line screw type under the conditions of cylinder temperature: 320° C., metallic mold temperature: 150° C., injection pressure: 1,000 kgf/cm², and injection speed: moderate. Then, the respective characteristics of the samples were evaluated and the results obtained are shown in Table 5.

TABLE 5

|  |  | Example 18 | | Example 19 | | Example 20 | |
|---|---|---|---|---|---|---|---|
| Composition All by Weight | PPS Resin | 60 | | 60 | | 40 | |
|  | Additive*1) | γ-Alumina | Basic Zinc Carbonate | γ-Alumina | Basic Zinc Carbonate | γ-Alumina | Basic Zinc Carbonate |
|  | Amount of Additive | 1 | 1 | 5 | 5 | 3 | 1 |

TABLE 5-continued

|  |  |  |  |  |
|---|---|---|---|---|
|  | Glass Fiber | 40 | 40 | 30 |
|  | Calcium Carbonate |  |  | 30 |
|  | PTFE |  |  |  |
|  | Mica |  |  |  |
|  | Talc |  |  |  |
| Corrosiveness to Metal*2) | Corrosion of metallic mold upon melting | ⊙ | ⊙ | ⊙ |
|  | Silver corrosion upon aging at temperatures no higher than melting point | ⊙ | ⊙ | ⊙ |
| Mechanical Strength | Tensile Strength (kgf/cm$^2$) | 1900 | 1800 | 1400 |
|  | Flexural Strength (kgf/cm$^2$) | 2400 | 2350 | 1800 |
|  | Izod Impact Strength (kgf · cm/cm) Not Notched | 38 | 36 | 22 |
|  | Notched | 10 | 9 | 6 |
| Water Resistance (Tensile Strength: kgf/cm$^2$) | Initial | 1900 | 1800 | 1400 |
|  | After PCT | 1750 | 1650 | 1250 |
| Insulating Property (Volume Resistivity: ohm · cm) | Initial | $2 \times 10^{16}$ | $2 \times 10^{16}$ | $4 \times 10^{16}$ |
|  | After PCT | $5 \times 10^{13}$ | $2 \times 10^{13}$ | $3 \times 10^{13}$ |

|  |  | Example 21 | | Example 22 | | Example 23 | |
|---|---|---|---|---|---|---|---|
| Composition All by Weight | PPS Resin | 55 | | 40 | | 40 | |
|  | Additive*1) | γ-Alumina | Magnesium Carbonate | γ-Alumina | Manganese Carbonate | γ-Alumina | Zinc Hydroxide |
|  | Amount of Additive | 1 | 3 | 3 | 1 | 1 | 3 |
|  | Glass Fiber | 30 | | 30 | | 30 | |
|  | Calcium Carbonate |  | | | | | |
|  | PTFE | 15 | | | | | |
|  | Mica |  | | 30 | | | |
|  | Talc |  | | | | 30 | |
| Corrosiveness to Metal*2) | Corrosion of metallic mold upon melting | ⊙ | | ⊙ | | ⊙ | |
|  | Silver corrosion upon aging at temperatures no higher than melting point | ⊙ | | ⊙ | | ⊙ | |
| Mechanical Strength | Tensile Strength (kgf/cm$^2$) | 1300 | | 1500 | | 1000 | |
|  | Flexural Strength (kgf/cm$^2$) | 1700 | | 2000 | | 1400 | |
|  | Izod Impact Strength (kgf · cm/cm) Not Notched | 25 | | 20 | | 16 | |
|  | Notched | 7 | | 6 | | 6 | |
| Water Resistance (Tensile Strength: kgf/cm$^2$) | Initial | 1300 | | 1500 | | 1000 | |
|  | After PCT | 1200 | | 1350 | | 900 | |
| Insulating Property (Volume Resistivity: ohm · cm) | Initial | $1 \times 10^{16}$ | | $4 \times 10^{16}$ | | $6 \times 10^{16}$ | |
|  | After PCT | $4 \times 10^{13}$ | | $1 \times 10^{13}$ | | $3 \times 10^{13}$ | |

|  |  | Comparative Example 12 | Comparative Example 13 | Comparative Example 14 | Comparative Example 15 | Comparative Example 16 | Comparative Example 17 |
|---|---|---|---|---|---|---|---|
| Composition All by Weight | PPS Resin | 60 | 60 | 60 | 40 | 55 | 40 |
|  | Additive*1) | None | γ-Alumina | ZnO | Li$_2$CO$_3$ | Ca(OH)$_2$ | Hydrotalcite |
|  | Amount of Additive | 0 | 10 | 2 | 4 | 4 | 4 |
|  | Glass Fiber | 40 | 40 | 40 | 30 | 30 | 30 |
|  | Calcium Carbonate |  |  |  | 30 |  |  |
|  | PTFE |  |  |  |  | 15 |  |
|  | Mica |  |  |  |  |  | 30 |
|  | Talc |  |  |  |  |  |  |
| Corrosiveness to Metal*2) | Corrosion of metallic mold upon melting | X | ⊙ | Δ | ○ | Δ | Δ |
|  | Silver corrosion upon aging at temperatures no higher than melting point | X | Δ | Δ | Δ | X | Δ |
| Mechanical Strength | Tensile Strength (kgf/cm$^2$) | 1800 | 1600 | 1400 | 1300 | 1200 | 1400 |
|  | Flexural Strength (kgf/cm$^2$) | 2300 | 2000 | 1900 | 1700 | 1600 | 1900 |
|  | Izod Impact Strength (kgf · cm/cm) Not Notched | 35 | 28 | 25 | 20 | 25 | 20 |
|  | Notched | 9 | 7 | 6 | 5 | 6 | 5 |
| Water Resistance (Tensile Strength: kgf/cm$^2$) | Initial | 1800 | 1600 | 1400 | 1300 | 1200 | 1400 |
|  | After PCT | 1700 | 1450 | 1150 | 900 | 900 | 1150 |
| Insulating Property (Volume Resistivity: ohm · cm) | Initial | $1 \times 10^{16}$ | $2 \times 10^{16}$ | $1 \times 10^{16}$ | $3 \times 10^{16}$ | $1 \times 10^{16}$ | $2 \times 10^{16}$ |
|  | After PCT | $6 \times 10^{14}$ | $1 \times 10^{13}$ | $8 \times 10^{12}$ | $2 \times 10^{10}$ | $2 \times 10^{11}$ | $1 \times 10^{12}$ |

*1)Additive:
γ-Alumina: Median particle size of 40 to 50 μm
Basic Zinc Carbonate: Commercially available reagent of Zinc Carbonate
Magnesium Carbonate (Normal Salt), Manganese Carbonate (Normal Salt), ZnO, Li$_2$CO$_3$, Ca(OH)$_2$: All reagent grade
Hydrotalcite has a structure of Mg$_{0.7}$Al$_{0.3}$(OH)$_2$·Co$_{3\text{-}0.5}$H$_2$O
*2)Judgement of corrosiveness to metal
⊙—No Corrosion
○—Slightly corroded
Δ—Fairly corroded
X—Considerably corroded

EXAMPLES 24 TO 27 AND COMPARATIVE EXAMPLES 18 AND 20

Using the PPS resin synthesized in Reference Example 1, raw materials shown in Table 6 were uniformly mixed in proportions shown in Table 6. Thereafter, the mixture was melt-kneaded at 320° C. using a biaxial extruder (diameter: 35 mm) to obtain pellets. The pellets were subjected to evaluation of the corrosiveness of the resin to metals, i.e., the corrosiveness to metallic mold steel and corrosiveness to silver upon aging at a temperature not higher than the melting point.

Then, the pellets were molded into dumbbells for the evaluation of mechanical strength and water resistance thereof using a 3 ounce injection molding machine of an in-line screw type under the conditions of cylinder temperature: 320° C., metallic mold temperature: 150° C., injection pressure: 1,000 kgf/cm², and injection speed: moderate. Then, both characteristics of the samples were evaluated and the results obtained are shown in Table 6.

TABLE 6

| | | Example 24 | | Example 25 | | Example 26 | |
|---|---|---|---|---|---|---|---|
| Composition | PPS Resin | 70 | | 70 | | 60 | |
| All by Weight | Additive*1) | γ-Alumina | Basic Zinc Carbonate | γ-Alumina | Basic Zinc Carbonate | γ-Alumina | Manganese Carbonate |
| | Amount of Additive | 5 | 5 | 1 | 1 | 1 | 3 |
| | PAN Carbon Fiber | 30 | | | | | |
| | Pitch Carbon Fiber | | | 30 | | 15 | |
| | PTFE | | | | | 15 | |
| | Graphite | | | | | 10 | |
| | Molybdenum Disulfide | | | | | | |
| Corrosiveness to Metal*2) | Corrosion of metallic mold upon melting | ⊙ | | ⊙ | | ⊙ | |
| | Silver corrosion upon aging at temperatures no higher than melting point | ⊙ | | ⊙ | | ⊙ | |
| Mechanical Strength | Tensile Strength (kgf/cm²) | 1900 | | 1200 | | 900 | |
| | Flexural Strength (kgf/cm²) | 2800 | | 1600 | | 1200 | |
| | Izod Impact Strength (kgf·cm/cm) | Not Notched | 25 | | 20 | | 15 |
| | | Notched | 6 | | 5 | | 4 |
| Water Resistance (Tensile Strength: kgf/cm²) | Initial | 1900 | | 1200 | | 900 | |
| | After PCT | 1700 | | 1000 | | 750 | |

| | | Example 27 | | Comparative Example 18 | Comparative Example 19 | Comparative Example 20 |
|---|---|---|---|---|---|---|
| Composition | PPS Resin | 55 | | 70 | 70 | 55 |
| All by Weight | Additive*1) | γ-Alumina | Magnesium Carbonate | γ-Alumina | Li₂CO₃ | ZnO |
| | Amount of Additive | 1 | 1 | 10 | 2 | 2 |
| | PAN Carbon Fiber | | | 30 | | |
| | Pitch Carbon Fiber | 30 | | | 30 | 30 |
| | PTFE | | | | | |
| | Graphite | | | | | |
| | Molybdenum Disulfide | 15 | | | | 15 |
| Corrosiveness to Metal*2) | Corrosion of metallic mold upon melting | ⊙ | | ⊙ | △ | △ |
| | Silver corrosion upon aging at temperatures no higher than melting point | ⊙ | | △ | △ | △ |
| Mechanical Strength | Tensile Strength (kgf/cm²) | 1100 | | 1500 | 1100 | 700 |
| | Flexural Strength (kgf/cm²) | 1400 | | 2200 | 1500 | 900 |
| | Izod Impact Strength (kgf·cm/cm) | Not Notched | 20 | 15 | 18 | 14 |
| | | Notched | 5 | 5 | 5 | 3 |
| Water Resistance (Tensile Strength: kgf/cm²) | Initial | 1100 | | 1500 | 1100 | 700 |
| | After PCT | 950 | | 1250 | 750 | 550 |

*1), *2)Same as Table 5

What is claimed is:

1. A polyphenylene sulfide resin composition comprising
   (1') a polyphenylene sulfide resin, and
   (2') γ-alumina, and
   (3') at least one compound selected from the group consisting of
   (a') zinc carbonate,
   (b') manganese carbonate,
   (c') magnesium carbonate, and
   (d') zinc hydroxide.

2. A polyphenylene sulfide resin composition comprising
   (1') from 100 parts by weight of a polyphenylene sulfide resin, and
   (2') from 0.01 to 10 parts by weight of γ-alumina, and
   (3') from 0.01 to 10 parts by weight of at least one compound selected from the group consisting of
   (a') zinc carbonate,
   (b') manganese carbonate,
   (c') magnesium carbonate, and
   (d') zinc hydroxide.

3. A polyphenylene sulfide resin composition as claimed in claim 1, further comprising
   (4') a filler other than said γ-alumina recited in (2') and said at least one compound recited in (3').

4. A polyphenylene sulfide resin composition as claimed in claim 3, wherein said filler is contained in said composition in an amount of from 5 to 75% by weight based on the weight of the composition.

5. A polyphenylene sulfide resin composition as claimed in claim 3, wherein said filler is one selected from the group consisting of glass fiber, carbon fiber, metal fiber, calcium carbonate, calcium sulfate, mica and talc.

* * * * *